Jan. 19, 1932.  K. BOGGESS  1,841,353
INSULATED CABLE STAPLE
Filed Dec. 10, 1930
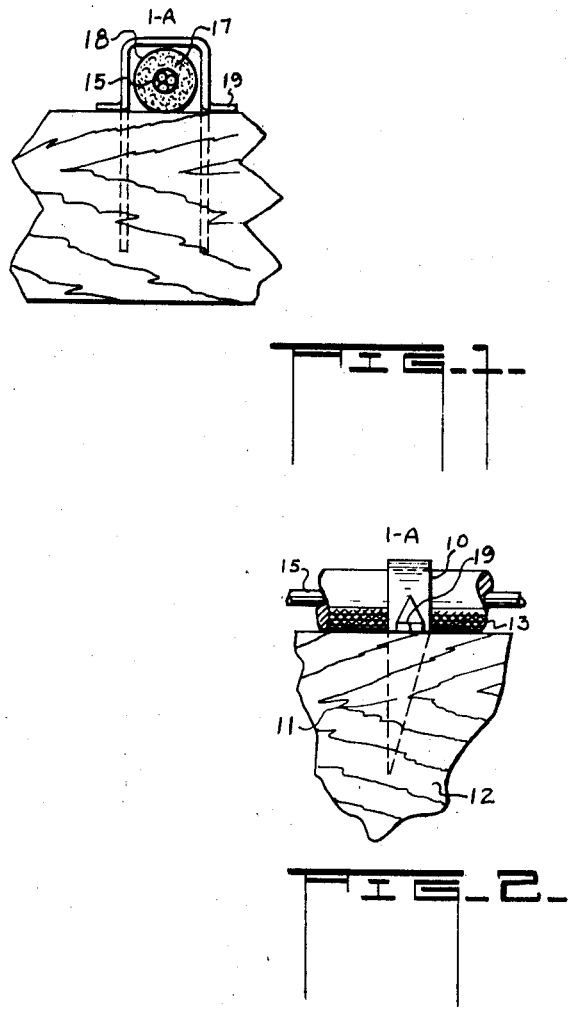

Patented Jan. 19, 1932

1,841,353

UNITED STATES PATENT OFFICE

KARL BOGGESS, OF PEORIA, ILLINOIS

INSULATED CABLE STAPLE

Application filed December 10, 1930. Serial No. 501,297.

This invention relates to insulated cable staples.

One of the objects of the invention lies in the provision of a staple adapted for use as a securing means for the conventional insulated electrical wiring of the cable type.

Another object lies in the provision of a staple for use in securing non-metallic sheathed insulated electric cables in electrical wiring work, said staples being so fashioned as to prevent, when driven into joist or the like, indenting or bruising in any manner of the cable.

Still another object lies in the provision of a heavy steel staple fashioned for use solely in securing well insulated non-metallic sheathed electric cable to joists, beams, etc., said staple being so fashioned as to permit its being driven into said beams or joists to a determined depth and thus prevent any possible injury or damage to the insulated cable.

Other objects will appear in the following specification, taken in connection with the annexed drawings, in which—

Fig. 1 is a front elevational view of the staple; and

Fig. 2 is a side elevation of Fig. 1.

Before referring specifically to the drawings, it might be stated that although there have heretofore been known various types of staples for use in securing insulated cable or wiring to adjacent beams, joists and the like; nevertheless such staples have never taken into consideration the fact that whenever the surface of insulated cable is indented, injured or damaged in any way the efficiency of such cable is greatly reduced and interferes directly with the proper successful operation thereof. As a matter of fact, injury to insulated cabling results in many instances in short-circuiting, which in turn of course results in fire. Further, with respect to insulated cabling, it might be said that there are ways well known to the trade for conducting currents of high voltage; in the first instance, there are flexible metal conduits, which are secured in such manner as to provide an indestructible housing for the insulated wire, which passes therethrough. This flexible housing is of metal and is sufficiently strong to prevent, under ordinary circumstances any possible destruction thereof, which would result in danger of fire to adjacent inflammable portions, from the electric current carried by the wire therein. This manner of conducting high voltage wiring is, however, quite expensive. Lately there has come into almost universal use a means of transmitting high voltage currents by means of electrical wiring, which is embedded in a heavy, well insulated, non-metallic surrounding portion, this surrounding portion or sheathing being rendered waterproof by the application of certain waterproofing preparations. Obviously, this cabling, due to the fact that it is extremely well insulated, makes the cable of considerable diameter, but even then permits the conduct of high voltage circuits at a greatly reduced cost. Further, the use of such insulated electrical cable renders installation of electrical wiring remarkably simple. The manner of attaching such cabling to adjacent beams or joists has heretofore been accomplished by the use of a heavy steel staple, in some instances the staple having a corrugated portion thereon which is adapted to indent the insulated portion, looking to the end of more firmly securing same, due to the fact that the indented portion projects slightly into the waterproofing material covering the insulated portion. Another heretofore satisfactory method of attaching cable is by means of a clip which surrounds the cable, said clip having apertures on each side, through which screws, nails or the like penetrate. However, and heretofore, whenever these heavy staples were used for the purpose of securing such insulated wiring, no provision has been made for preventing the staple from being driven into the insulated cable with the result that in multiple instances the efficiency of the cable has been greatly reduced and damage resulted from the imperfect insulation of an electric wire carrying an extremely high voltage.

The extensive use of electrical equipment has resulted in the almost common use of electrical circuits of a dangerously high voltage, and it is that use which has prompted the development of the insulated and waterproofed heavy electrical cable.

Applicant now presents a staple adapted for use solely in securing this heavy well insulated waterproofed non-metallic electrical cable to adjacent beams, joists, and the like.

In the various figures of the drawings, a staple is shown which is formed from heavy steel, the same in each instance providing a head portion 10, and downwardly projecting pointed attachment ends 11. Obviously, these ends 11 are fashioned to be driven securely into an adjacent beam or joist 12.

The cable has been shown as a round, sheathed cable.

In the drawings, the wiring has been designated 15, while the surrounding and insulation portion is referred to as 17, the heavy waterproofed cover surrounding same being designated 18.

In Figs. 1 and 2 the staple is shown formed with a portion of the side struck out in lateral abutments 19.

As respects the operation of my staple, the same is thought to be apparent in view of the drawings and description, although it might be reiterated at this time that when using such a heavy steel staple for securing sheathed cabling of the well known type which carries a high voltage and therefore dangerous electrical current, there is absolutely no possibility of the staple, when driven by a careless operator of either breaking the waterproof covering therefor or in any other way damaging the insulation which would result in almost certain danger of fire.

Further, with respect to the character of cable that is adapted to be secured by these staples, it might be stated that although same is approved by the underwriter laboratories maintained by fire insurance companies, in its most perfect condition, nevertheless no guaranty of said cable is made when the insulation portion has been broken, because although when insulated in the proper manner same may satisfactorily house and carry a high voltage circuit, nevertheless when broken the electrical circuit is of such intensity as to be able to pass through same and by so doing cause damage by fire.

Applicant is aware that there are a great many different types and classes of staples dating from perhaps the most original ones which show merely a staple with an insulating material secured thereto. Such class and type of staples are merely adapted to secure low voltage wires, while the present staple is primarily formed and adapted for use in the securing of well insulated cabling adapted to carry a high voltage circuit.

What I claim is:

A one piece, U-shaped staple comprising a flat head portion, extending side portions formed substantially at right angles to the flat head portion, lugs normally forming a portion of the sides struck outwardly therefrom to provide lateral abutments and serving to limit the distance that the staple may be driven into a beam or joist when used to secure electric cable to the beam or joist, thus preventing the possibility of injury to the insulation on the electric cable, triangular pointed securement portions extending downwardly from the side portions, each of said securement portions being formed of a substantially straight edge portion which extends substantially at right angles to the flat head portion and lies in substantially the same plane as one of the edges of the head portion, the other extending edge of said pointed securement portion running diagonally from a point adjacent the extending lug to the pointed end of the securement portion.

In testimony whereof, I have hereunto affixed my signature.

KARL BOGGESS.